(12) United States Patent
Snow et al.

(10) Patent No.: US 6,237,453 B1
(45) Date of Patent: May 29, 2001

(54) TWO POSITION TOOL SLIDE FOR SCREW MACHINE

(75) Inventors: Jeffrey C. Snow, Fairport; Sandro G. Belpanno, Rochester, both of NY (US)

(73) Assignee: C.J. Winter Machine Technologies, Inc., Rochester, NY (US)

( * ) Notice: Subject to any disclaimer, the term of this patent is extended or adjusted under 35 U.S.C. 154(b) by 0 days.

(21) Appl. No.: 09/419,565

(22) Filed: Oct. 18, 1999

(51) Int. Cl.$^7$ ........................................ B23B 5/46
(52) U.S. Cl. .................. 82/137; 82/154; 82/158; 82/161; 82/110
(58) Field of Search .................. 82/137, 132, 136, 82/154, 158, 161, 1.2, 1.4, 1.5, 12, 13, 110

(56) References Cited

U.S. PATENT DOCUMENTS

| | | | | |
|---|---|---|---|---|
| 4,114,486 | * | 9/1978 | Hooker | 82/12 |
| 4,165,661 | * | 8/1979 | Wasco, Jr. et al. | 82/117 |
| 4,947,715 | * | 8/1990 | Council, Jr. | 82/12 X |
| 4,995,300 | * | 2/1991 | Kaplan et al. | 82/12 |
| 5,842,395 | * | 12/1998 | Hall | 82/12 |

* cited by examiner

*Primary Examiner*—Henry Tsai
(74) *Attorney, Agent, or Firm*—Shlesinger Fitzsimmons Shlesinger

(57) ABSTRACT

A rigid tool slide support is disposed to be mounted in a screw machine in either of two different operating positions in each of which a tool slide reciprocates on the upper surface of the support to convey a cutting tool to and from the work that is to be machined. Projecting centrally from the bottom surface of the slide is an elongate, dovetail shaped guide which is slidably mounted in a similarly shaped but slightly wider recess in the support. Secured in the recess of the support adjacent one side thereof, and slidably engaged with a confronting side of the dovetail guide of the slide, is an elongate expansion gib having therein an adjusting screw that is rotatably adjustable to expand or contract the length of the gib, thereby to adjust the running clearance between the support and the slide. Mounted on the slide are two coupling pins, one of which is connected to a pivotal slide operating arm when the support is mounted in one of its two different operating positions, and the other of which pins is adjustable into and out of an operating position in which it projects from one side of the slide and into a reciprocable slide operating arm when the support is mounted in the other of its two operating positions,

12 Claims, 3 Drawing Sheets

TWO POSITION TOOL SLIDE FOR SCREW MACHINE

BACKGROUND OF THE INVENTION

This invention relates to tool slides for use on screw machines, or the like, and more particularly to a novel tool slide which is suitable for use in either of two different operating positions on a multiple spindle screw machine. Even more particularly this invention is related to an improved dovetail tool slide and mounting means therefor including a dovetail expansion gib.

There are in use today a large number of machine tools which employ tool slides of the type in which a tool holder is mounted on a respective slide for reciprocation thereby toward and away from the work that is to be machined. Moreover, in many such machines the slide has thereon a dovetail shaped guide which is slidably mounted in a correspondingly shaped recess formed in the upper surface of a support bracket or base. Repeated reciprocation of the slide toward and away from the work tends to generate wear between the dovetail shaped guide and the walls of the recess in which the guide reciprocates. It is therefore customary to employ a longitudinally tapered brass gib between the guide and associated support properly to align the guide for reciprocation in the recess in the associated support, and also to compensate, when necessary, for excessive wear between the moving parts. Customarily the gib is secured to the support, so that the dovetail guide on the slide has one surface thereof sliding against a confronting surface on the associated gib thus causing wear on one or the other or both of the confronting, sliding surfaces. Consequently, to compensate for such wear it becomes necessary rather frequently to replace the worn gib, and to requalify both the guide surfaces and the walls of the recess to eliminate any undesirable running clearance and consequent lateral movement or play between the slide and the associated support.

Still another problem with certain screw machines of the type described is that each such machine utilizes two different slides, one such slide being mounted for operation in one area of the machine, say position A, and the other slide being mounted in another area of the machine, say at position B. While portions of these two slides are similar in configuration, each such slide is unique, and has provisions to accept tooling and operate in only one of two positions on the machine. Also, each slide is manipulated or reciprocated by a different mechanism, and therefore each such slide must have thereon a different mechanism for connecting the respective slide with the associated reciprocating mechanism. As a consequence, when one such slide wears out or must be replaced, care must be taken to make sure that the correct replacement part is ordered, since the slides are different, and a slide for position A cannot be employed in position B, and vice versa.

It is an object of this invention, therefore, to provide an improved tool slide of the type described which is designed for operation in either position A or position B of a machine of the type described, and therefore obviates the need for utilizing or maintaining two different slides for such a machine.

Another object of this invention is to provide an improved tool slide of the type described, which has mounted thereon two different coupling means, one of which is utilized to connect the slide to an operating mechanism of a screw machine when the slide is in one of two different positions on the machine, say position A, and the other of which coupling means is utilized for connecting the slide to another operating mechanism when the slide is located in position B on the machine.

Still another object of this invention is to provide an improved tool slide of the type described having a dovetail guide which is mounted in a correspondingly shaped recess in a slide support by means of a dovetail expansion gib, which can be readily adjusted to minimize running clearance between the dovetail guide of the slide and the associated support.

Other objects of the invention will be apparent hereinafter from the specification and from the recital of the appended claims, particularly when read in conjunction with the accompanying drawings.

SUMMARY OF THE INVENTION

An elongate, rigid slide support is disposed to be mounted in a screw machine in either of two different operating positions in each of which a plane upper surface of the support has therein, and, centrally thereof, an elongate, dovetail shaped recess. A tool slide which is reciprocable on the upper surface of the support longitudinally thereof has projecting centrally from a plane, bottom surface thereof, an elongate, dovetail shaped guide which is similar in configuration to and is slidably mounted in the dovetail shaped recess in the support. Secured in the dovetail recess of the support adjacent one side thereof, and slidably engaged with the confronting side of the dovetail guide of the slide, is an elongate dovetail expansion gib. An adjusting screw which extends through the center of the gib is rotatably adjustable to contract the length of the gib, causing the expansion of the sides of the gib, thereby adjusting the running clearance between the support and the reciprocable slide.

Mounted on the upper surface of the slide is a first coupling pin which is connected to a pivotal slide operating arm when the support is mounted in one of the two operating positions on the machine. Adjustably mounted in a bore formed in the side of the slide is a second coupling pin which is adjustable into and out of an operating position in which it projects from one side of the slide and into a reciprocable slide operating arm when the support is mounted in the other of two operating positions on the machine.

THE DRAWINGS

Figure 1:
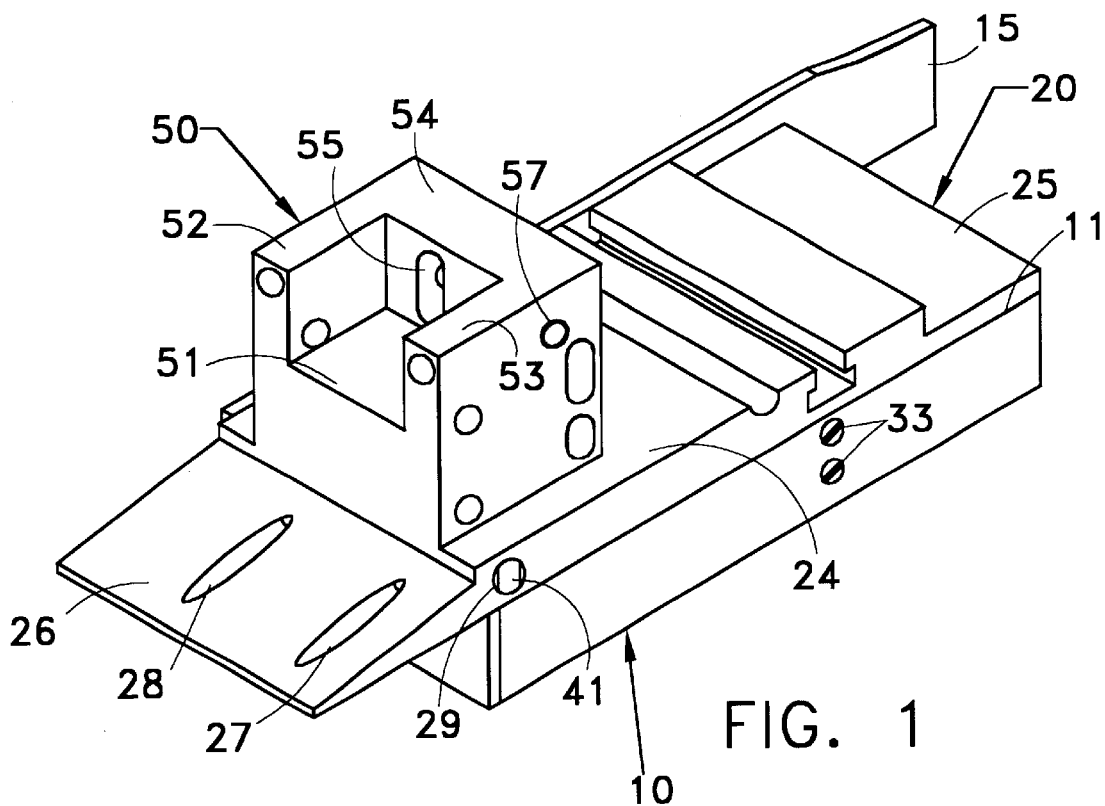
FIG. 1 is a perspective view of an improved screw machine tool slide and support or base therefor made according to one embodiment of this invention, the view illustrating most of the upper surface and one side of the slide and its associated support.
Figure 4:
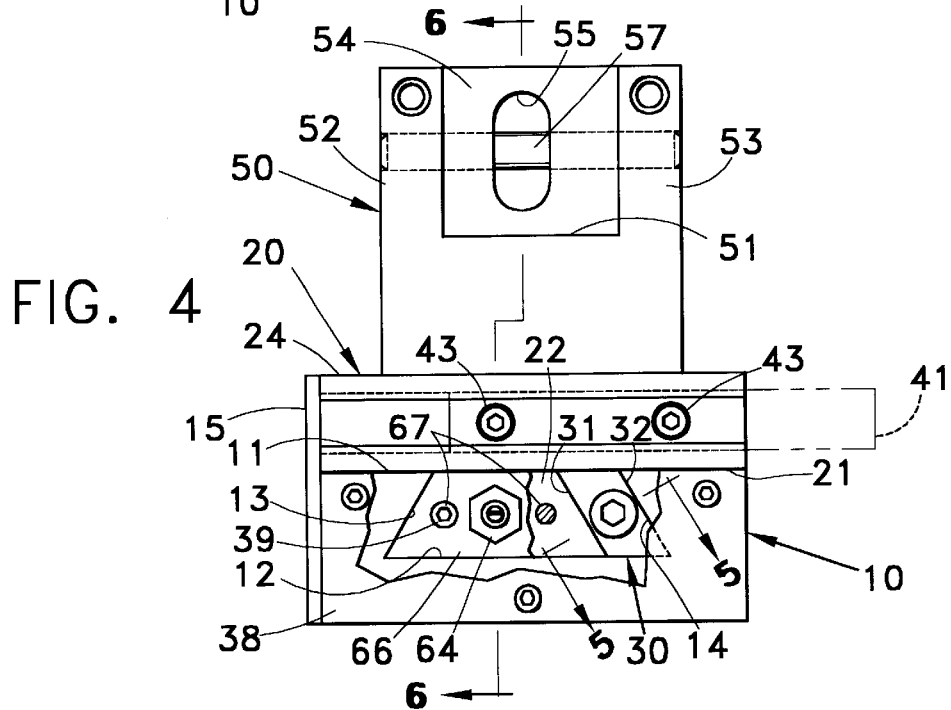
FIG. 4 is an end elevational view of this slide and its support as seen when looking at the left end of the assembly as shown in FIG. 3, and with portions of the support end cap or plate and a spring retainer plate being broken away in part.
Figure 6:
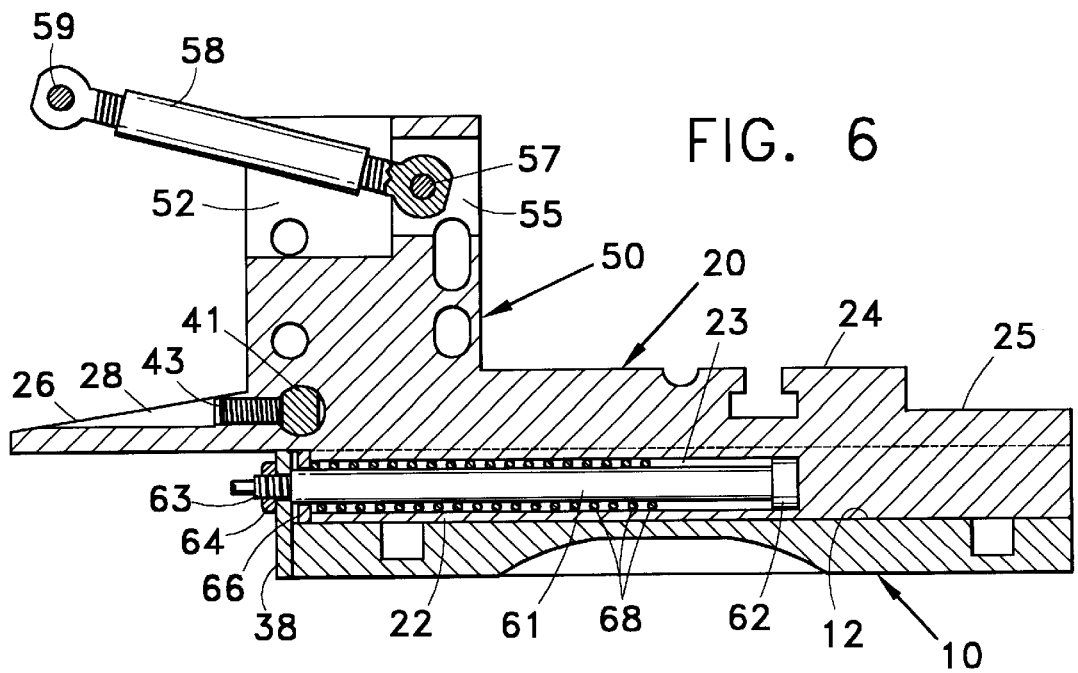
Figure 7:
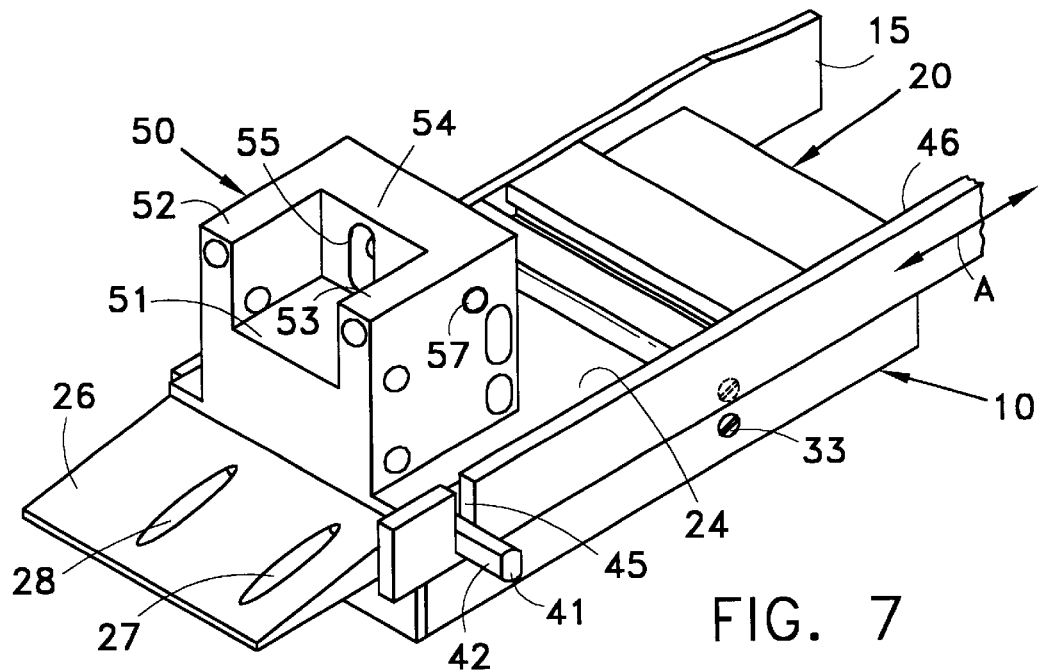

FIG. 6 is a sectional view taken generally along the line 6—6 in FIG. 4 looking in the direction of the arrows, and showing the other of the two slide coupling means as it appears when connected to one of two different slide operating mechanisms of the associated screw machine; and FIG. 7 is a perspective view similar to FIG. 1, but showing the first slide coupling means in its operating position and connected to the other of the two slide operating mechanisms of the associated machine.

DETAILED DESCRIPTION OF THE PREFERRED EMBODIMENTS

Referring now to the drawings by numerals of reference, 10 denotes generally a slide support, which is generally rectangular in configuration, and which is disposed to be secured in any one of two different slide operating positions (position A and position B) on a screw machine of the type described. In its plane, flat upper surface 11 support 10 has formed therein an elongate, dovetail shaped groove 12 (FIGS. 3 to 5) which extends longitudinally between opposite ends of support 10 centrally thereof, and which has opposed, inclined sidewalls 13 and 14 (FIG. 4). Secured to one side of slide support 10 (the left side in FIG. 4) is an elongate plate 15, which extends slightly above the support and slightly beyond one end thereof to function as a chip shield when the associated slide is placed in use.

Mounted for limited sliding movement longitudinally of the support 10 is a tool slide, which is denoted generally by the numeral 20. Slide 20 has a plane, flat bottom surface 21 mounted for coplanar, sliding movement on the upper surface 11 of the support 10, and intermediate its ends has a plane, flat upper surface 24 disposed to have a tool secured thereon as noted hereinafter. Projecting from the surface 21 of slide 20 and slidably into recess 12 is a dovetail shaped guide 22, which has a cross sectional configuration similar to that of the recess 12, but which is slightly narrower than that of recess 12, so that in use only one of the inclined sidewalls of guide 22 is slidably engaged with the sidewall 13 of recess 12. The other sidewall of guide 22 is spaced from the opposed sidewall 14 of the recess 12, and is guided for sliding movement against the sidewall 13 of the recess 12 by means of a dovetail expansion gib 30, which is mounted in recess 12 between the guide 22 and wall 14 of the recess. Gib 30 is substantially the same length as the dovetail guide 22, and in an unstressed or preadjusted position, has opposed, parallel upper and lower surfaces, respectively, the former of which normally has a slight running clearance with respect to the bottom surface 21 of the slide 20, and the lower surface of which rests on the bottom of recess 12. As shown in FIG. 4, the gib 30 also has opposed, parallel side surfaces 31 and 32, one of which confronts upon the sidewall 14 of recess 12, and the other of which has sliding engagement with the confronting, inclined sidewall of guide 22. Gib 30, however, is secured against sliding movement in recess 12 by a pair of screws 33, the shanks of which extend through the side of support 10 adjacent the gib 30, and are threaded at their inner ends into the gib to secure it against movement relative to the support 10.

Figure 5:
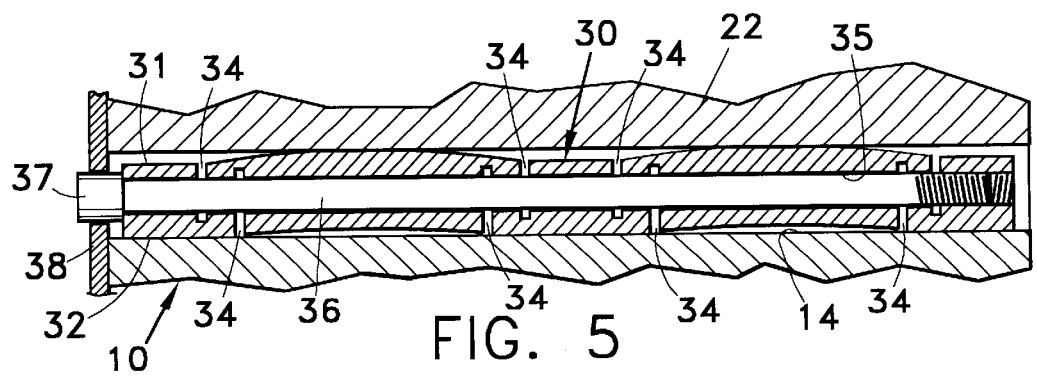
FIG. 5 is a slightly enlarged, fragmentary sectional view taken generally along the line 5—5 in FIG. 4 looking in the direction of the arrows.

As shown more clearly in FIG. 5, gib 30 has formed intermediate its ends in each of its sides 31 and 32 a plurality of longitudinally spaced, transverse or lateral grooves 34, and has therethrough an axial bore 35. Mounted for rotation coaxially in the bore 35 is the reduced-diameter shank 36 of a screw having an enlarged-diameter head 37 which overlies one end of the gib 30, and is rotatable in an opening in an end cap or plate 38 which is secured by screws 39 over the back end of the support 10. Shank 36 has on its opposite end an externally threaded portion which threads adjustably into an internally threaded section of the bore 35; and the head 37 has therein a recess for accommodating a conventional allen wrench, which can be utilized to rotate the screw shank 36 in a direction slightly to compress the overall length of the gib 30. This causes portions of the gib between the grooves 34 to bow slightly as shown in FIG. 5, so that portions of the gib intermediate its ends expand slightly in a direction toward the confronting side of the dovetail guide 22, thereby reducing and minimizing the running clearance between the support 10 and the reciprocating slide 20. Moreover, as a result of the angle at which the gib 30 is mounted, and subsequently expanded, the running clearance is minimized not only between the sidewalls of recess 12, but also in a vertical direction so that the gib 30 effectively urges the guide 22 downwardly in recess 12 thereby minimizing the running clearance on the horizontally disposed running surfaces. Also, to prevent any intereference with the sliding motion of the guide 22 in recess 12, the surface of the gib confronting upon the guide 22 has coated thereon a protective surface which minimizes friction and wear between these two sliding surfaces.

Figure 3:
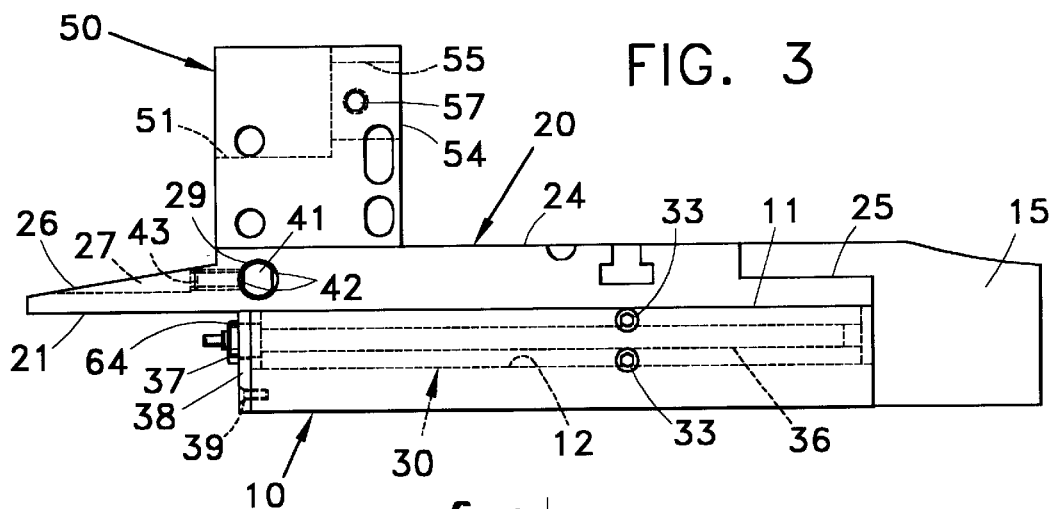
FIG. 3 is a slighty enlarged side elevational view of this slide and associated support as seen when looking at the right side of the slide shown in FIGS. 1 and 2.

A portion of the slide 20 at its forward end (the right end as shown in FIG. 3) has formed thereon a rectangular extension 25 which overlies and slides upon the upper surface 11 of support 10. At its opposite end slide 20 has formed thereon an inclined upper surface 26, which extends diagonally downwardly toward the bottom surface 21 and has formed therein two, spaced, parallel grooves or recesses 27 and 28 which extend longitudinally in the slide and parallel to its direction of reciprocation. At their inner ends the recesses 27 and 28 register with the outer ends of two internally threaded circular openings which open at their inner ends on a circular opening 29, which extends between, and opens at opposite ends upon, opposite sides of the plate which forms slide 20.

Figure 2:
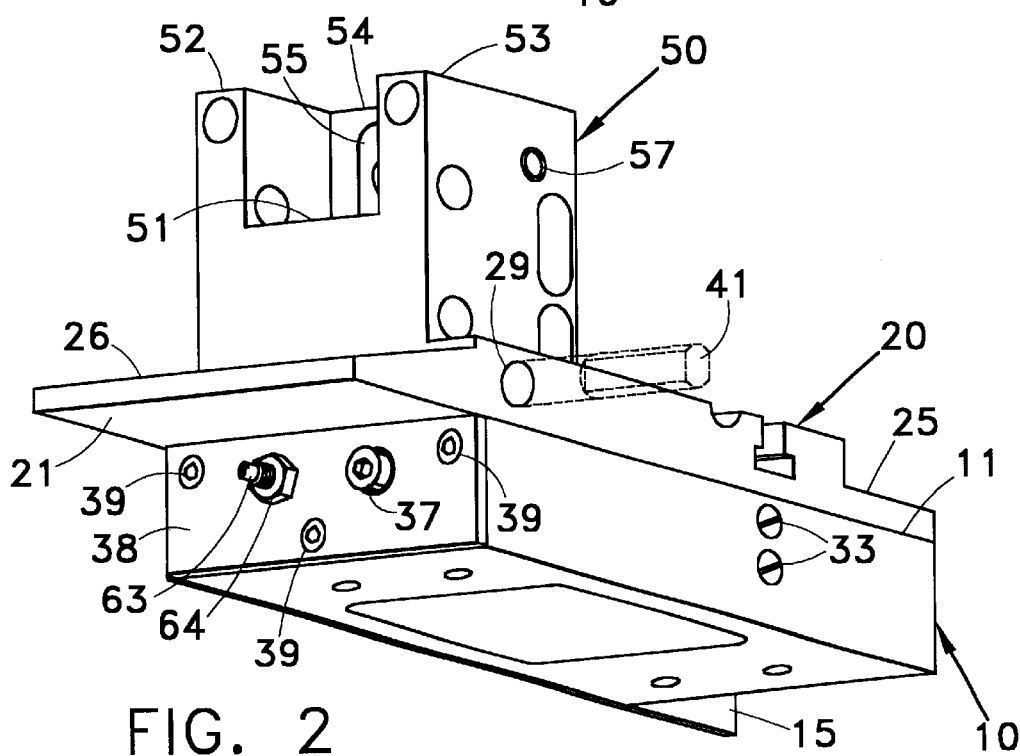
FIG. 2 is another perspective view of this slide and its support illustrating the underside of the slide support at one end thereof, and with the first of two slide coupling means being shown in phantom by broken lines in its operating position.

Removably and slidably mounted in the opening 29 coaxially thereof is an elongate coupling pin 41 having formed on diametrally opposite sides thereof parallel, flat surfaces 42 (FIG. 3) which are employed as noted hereinafter, for coupling the slide 20 to a certain operating mechanism when the slide is mounted in position B of the two above-noted different slide operation positions in a screw machine of the type described. Also, as shown in FIGS. 3 and 6, one of the flats 42 on pin 41 confronts the openings formed on the inner ends of the recesses 27 and 28, and in each such opening is releasably threaded a screw 43. The inner ends of screw 43 are engagable with one of the flats 42 to secure the pin 41 adjustably in an inoperative position within the opening 29, as shown in FIG. 1, or in an active position in which pin 41 projects out of opening 29 as shown in FIG. 7, and as shown in phantom in FIGS. 2 and 4. When coupling pin 41 is in its active position as shown in FIG. 7, it is seated in a registering notch or recess 45 in an operating rod 46 that is reciprocated in the direction of arrows A by the operating mechanism for a slide mounted in position B of the screw machine.

Integral with the upper surface 24 of slide 20 adjacent one end thereof (the left end as shown in FIG. 3) is a cube-shaped housing which is denoted generally by the numeral 50. Housing 50 has in its upper surface, and opening on one end thereof (the left end in FIG. 3), a large rectangular recess 51. Recess 51 forms in the housing two, spaced, parallel sidewalls 52 and 53, and an integral end wall 54 which extends between and at right angles to the walls 52 and 53. The front wall 54 has therethrough, and centrally thereof, an oval shaped opening the longitudinal axis of which extends at right angles to the surface 24. Secured in an opening that extends through the front wall 54 coaxially of an axis that intersects the longitudinal axis of the oval opening 55, is an elongate, rigid coupling pin 57, which extends intermediate its ends transversely across the oval opening 55, and at right angles to the longitudinal axis thereof. When, as shown in FIG. 6, slide 20 is mounted in operating position A rather than position B, the portion of the coupling pin 57 that traverses opening 55 is pivotally connected to one end of an elongate operating rod 58, the opposite end of which extends rearwardly out of recess 51 and is pivotally connected by pin 59 to a slide operating mechanism different from that which is disposed to be connected to the coupling pin 41.

Whenever a slide 20 and its associated support or base 10 are placed in use in either positions A or B in a screw machine, a conventional cutting tool or the like (not illustrated) is disposed to be mounted on the upper surface 24 of the slide 20 just forward of housing 50. The particular tool and the manner in which it is mounted on slide 24 is not part of this invention and therefore has not been illustrated and described in detail herein. In any event, whenever the slide 20 is shifted from an inactive to an active position in order to introduce the tool thereon into engagement with the work that is to be machined, the slide 20 is caused to be shifted by the rod 46 or rod 58 relative to the underlying support or base 10 from a retracted, or inoperative position as shown in FIGS. 3 and 6, to an operative position in which the slide has been shifted toward the right in FIGS. 3 and 6 relative to the underlying support 10.

As shown in FIG. 6, the dovetail shaped guide 22 has extending inwardly from the rear or left end thereof, and centrally thereof, an elongate, circular blind bore 23. Mounted in bore 23 coaxially thereof is an elongate, cylindrically-shaped spring guide 61 having on its inner end an enlarged diameter head section 62 which is slidably seated in the bottom of the bore 23. Guide 61 has at its opposite end a reduced-diameter, externally threaded outer end 63 which extends through a central opening in the end cap or plate 38 and is secured by a nut 64 to the cap 38 to prevent any axial movement of the guide 61. Inwardly of the end cap 38 the guide 61 also extends through a central opening in a spring retainer plate 66 (FIGS. 4 and 6), which is secured by screws 67 (FIG. 4) against the rear or left end (FIG. 6) of the guide 22 in spaced, confronting relation to the end cap 38. Between its large end 62 and its retainer plate 66, the guide 61 is surrounded by a coiled compression spring 68, the overall length of which is slightly less than the space between the head 62 and the retainer plate 66.

Accordingly, when, for example, the slide 20 as shown in FIG. 6 is advanced toward in operating position by the rod 58, or in other words toward the right in FIG. 6 relative to the support 10, the wall of bore 23 slides relative to guide 61 and its head 62, and in so doing the retainer plate 66, and the spring 68 engaged thereby, slide longitudinally of the guide 61 toward its head 62, eventually causing the spring to engage the head 62 and to be compressed as the slide 20 continues to advance toward its operative position. The now-compressed spring 68 urges the retainer plate 66, and hence the guide 22 and with it the slide 20 back toward the retracted position as shown in FIG. 6, thereby removing any backlash from the slide operating mechanism. It will be apparent that spring 68 functions in a similar matter when the slide 20 is in position B, and is advanced to its operative position by the rod 46.

From the foregoing it will be apparent that the present invention provides a relatively simple and inexpensive tool slide, which can be readily mounted in either one of two different operating positions in a screw machine (position A or position B), the slide having thereon two different coupling means for selectively coupling the slide for operation by two different threading mechanisms, one located in position A and the other in position B. Further than this, and very importantly, the life of the slide is substantially prolonged by use of a dovetail expansion gib 30 disposed between the dovetail-shaped slide guide 22 and the support or base 10 in which it slides. The gib, which is readily adjustable, permits accurate adjustment of the running clearance between the slide and its support, and considerably extends the overall useful life not only of the slide, but also of its associated gib.

While this invention has been illustrated and described in detail in connection with only certain embodiments thereof, it will be apparent that this application is intended to cover any such modifications as may fall within tie scope of one skilled in the art, or the appended claims.

What is claimed is:

1. In a screw machine having two separate tool slide operating mechanisms, one having a pivotal operating arm for manipulating a tool slide mounted in one of two different operating positions on the machine, and the other mechanism having a reciprocable operating arm for manipulating a tool slide mounted in the other of said two different operating positions on the machine, an improved tool slide operable in either of said two different operating positions, comprising an elongate tool slide support disposed to be secured to said machine in either of said two different operating positions, and in each of which positions said support has thereon a plane upper surface, an elongate tool slide mounted on said upper surface of said support for reciprocable sliding movement in a direction longitudinally thereof, said slide having thereon an elongate dovetail shaped guide slidable in a correspondingly shaped recess formed in said upper surface of said support, first coupling means on said slide for releasably connecting said slide to said pivotal operating arm to be reciprocated thereby on said support when said support is secured to the machine in said one operating position, and second coupling means on said slide for releasably connecting said slide to said reciprocable operating arm for reciprocation thereby on said support when said support is secured to the machine in said other of said operating positions.

2. In a screw machine as defined in claim 1, including an elongate dovetail expansion gib mounted in said recess in said support for engagement at one side thereof with said guide and at the opposite side thereof with said support.

3. In a screw machine as defined in claim 2, wherein said gib has therethrough a longitudinally extending axial bore, an elongate gib adjusting screw was a cylindrical shank portion thereof extending rotatably and coaxially through said bore, and said shank has on one end thereof an externally threaded portion adjustably threaded into an internally threaded portion of said bore adjacent one end thereof, and said shank projects at its opposite out of said bore and has formed thereon an enlarged diameter head section which overlies the adjacent end of said gib.

4. In a screw machine as defined in claim 1, wherein said first coupling means comprises a housing secured to and projecting above said slide at the side thereof remote from said support, and a pin carried by said housing for movement therewith and pivotally connected intermediate its ends to said pivotal operating arm when said support is secured in said one operating position, thereby to cause said pivotal operating arm to impart said reciprocable movement to said slide.

5. In a screw machine as defined in claim 1, wherein said second coupling means comprises a pin adjustably mounted on said slide for reciprocation therewith, and means for releasably securing said pin on said slide for movement selectively into and out of an operative position in which said pin projects at one end thereof beyond one side of said slide and is connected to said reciprocable operating arm when said support is secured in said other operating position.

6. In a screw machine as defined in claim 5, wherein said pin is adjustably mounted coaxially in a bore formed in said slide to extend transversely between opposite sides of said slide and normal to the direction of reciprocation of said slide on said support, and said means for releasably securing said pin is operable releasably to secure said pin in an inoperative position in which said one end of said pin is positioned within said bore.

7. A tool slide device for a screw machine, comprising an elongate support disposed to be secured in either of two different operating positions on a screw machine, a tool slide having an upper surface disposed to have a cutting tool secured thereon, and having a plane bottom surface slidably mounted on a plane upper surface of said support for reciprocation in a direction longitudinally thereof to convey a cutting tool toward and away from work that is to be machined, said support having formed in said upper surface thereof and extending longitudinally between opposite ends thereof, a dovetail shaped recess, said slide having fixed to and projecting from said bottom surface thereof a dovetail shaped guide similar in cross section to but slightly narrower than, the cross sectional configuration of said recess, thereby to form a running clearance between said slide and said support, said guide being seated in said recess in said support for sliding movement longitudinally thereof, and with one side thereof being spaced from one side of said recess, an elongate dovetail expansion gib secured in said dovetail recess in the space between said guide and said one side of said recess, an end cap secured over and covering one end of said support and one end of said recess therein, and a gib adjusting screw rotatably mounted in an axial bore in said gib and having on one end thereof an enlarged diameter head overlying one end of said gib and rotatable in an opening in said end cap.

8. A tool slide device as defined in claim 7, including a housing secured to and projecting above said upper surface of said slide, and a first coupling pin secured in said housing to extend in a direction transversely of the length of said guide, said housing having therethrough an opening registering with a portion of said first pin, said portion of said first pin disposed to be connected to a first slide operating mechanism when said support is secured in one of said two operating positions.

9. A tool slide device as defined in claim 8, including a second coupling pin mounted in an opening formed in said slide to open one one side thereof, and means for releasably securing said second coupling pin selectively in an operative position in which one end thereof extends beyond said one side of said slide for attachment to a second slide operating mechanism, when said support is secured in the other of said two operating positions, and in an inoperative position in which said one end of said second coupling pin is positioned within said opening in said slide.

10. A tool slide device as defined in claim 7, including a cylindrical spring support secured at one end to said end cap and extending at its opposite end coaxially and slidably into one end of a bore formed in said dovetail shaped guide to extend parallel to the direction of reciprocation of said slide, and a coiled compression spring mounted on said spring support intermediate the ends thereof and operative resiliently to resist movement of said slide toward the work that is to be machined.

11. A tool slide device as defined in claim 10, including a dovetail shaped end plate secured to one end of said dovetail shaped guide to overlie said one end of said bore therein, said cylindrical spring support extending coaxially and slidably through a circular bore formed in said end plate centrally thereof, and one end of said compression spring being engageable with said end plate to limit the movement of said spring on said spring support.

12. A tool slide device as defined in claim 7, wherein said gib has formed therein intermediate its ends a plurality of longitudinally spaced, transverse grooves certain of which open on said one side of said guide, and the others of which open on said one side of said recess in said support, and said adjusting screw has at the end thereof remote from said enlarged diameter head thereof, an externally threaded portion adjustably threaded into an internally threaded portion of said bore in said gib, and operative upon rotation of said head to effect adjustment of said transverse grooves in said gib and consequent adjustment of the running clearance between said slide and said support.

* * * * *